US011945005B2

(12) United States Patent
Zreda

(10) Patent No.: US 11,945,005 B2
(45) Date of Patent: Apr. 2, 2024

(54) SMOG REMOVAL BY CITY-SCALE VENTILATION AND CIRCULATION

(71) Applicant: Marek Zreda, Tucson, AZ (US)

(72) Inventor: Marek Zreda, Tucson, AZ (US)

(*) Notice: Subject to any disclaimer, the term of this patent is extended or adjusted under 35 U.S.C. 154(b) by 612 days.

(21) Appl. No.: 16/855,772

(22) Filed: Apr. 22, 2020

(65) Prior Publication Data

US 2020/0331042 A1 Oct. 22, 2020

Related U.S. Application Data

(60) Provisional application No. 62/837,116, filed on Apr. 22, 2019.

(51) Int. Cl.
*B08B 15/00* (2006.01)
*F24F 8/99* (2021.01)

(52) U.S. Cl.
CPC .............. *B08B 15/00* (2013.01); *F24F 8/99* (2021.01)

(58) Field of Classification Search
CPC ........................ B08B 15/00; B01D 2258/06; B01D 2279/40; F24F 8/99; E04H 12/28; A01G 15/00; Y02C 20/40; F23J 11/00; F23J 11/12; F04D 19/00; F04D 19/002; F04D 19/005; F04D 19/007; Y02E 10/72; Y02E 10/727; Y02E 10/728; Y02E 10/74; E04F 17/02
USPC ...................... 454/228, 4, 14.1; 138/119, 118
See application file for complete search history.

(56) References Cited

U.S. PATENT DOCUMENTS

| 1,499,894 A | 7/1924 | Waterman | A01G 13/08 |
| 2,457,934 A | 1/1949 | Spieth | 98/40 |
| 2,736,137 A | 2/1956 | Thaheld | 47/2 |
| 3,055,145 A | 9/1962 | Lindsay | 47/2 |
| 3,243,890 A | 4/1966 | Easterday | 34/33 |
| 3,643,581 A | 2/1972 | Feldman | A23C 9/10 |
| 3,747,502 A | 7/1973 | Williams, Sr. | F24F 7/06 |

(Continued)

FOREIGN PATENT DOCUMENTS

| CN | 2853894 | 1/2007 | E01H 1/08 |
| CN | 104689661 | 6/2015 | B01D 47/02 |

(Continued)

OTHER PUBLICATIONS

A1partyrental, Sky Dancers—Single Tube, Jul. 24, 2012, https://www.youtube.com/watch?v=CDIpdJYbnIA (Year: 2012).*

(Continued)

*Primary Examiner* — Avinash A Savani
*Assistant Examiner* — Dana K Tighe
(74) *Attorney, Agent, or Firm* — HAYES SOLOWAY P.C.

(57) ABSTRACT

A system and method for reducing smog in an urban area includes an urban area having an urban surface. A smog atmospheric layer is located above the urban surface. A mixing atmospheric layer is located above the smog atmospheric layer. A plurality of turbines is located on the urban surface and moves a quantity of air between the smog atmospheric layer and the mixing atmospheric layer. A system and method for reducing smog in an urban area includes an urban area and a rural area adjacent to the urban area. An urban boundary demarcates the urban area and the rural area. A plurality of turbines is located within the rural area and/or the urban area, and moves a quantity of air between the urban area and the rural area.

8 Claims, 13 Drawing Sheets

(56) References Cited

U.S. PATENT DOCUMENTS

| | | | | |
|---|---|---|---|---|
| 4,172,557 | A | 10/1979 | Davis | B05B 7/26 |
| 4,936,198 | A | 6/1990 | De Mendoza Sans | 98/1 |
| 5,147,429 | A | 9/1992 | Bartholomew | 55/356 |
| 5,305,548 | A | 4/1994 | Siebol | A01G 13/00 |
| 5,938,526 | A | 8/1999 | De Mendoza Sans | 454/341 |
| 6,186,857 | B1 * | 2/2001 | Gazit | G09F 15/0025 40/406 |
| 6,223,995 | B1 | 5/2001 | Evans et al. | A01G 15/00 |
| 6,257,498 | B1 | 7/2001 | Siebol | B05B 9/06 |
| 6,804,905 | B1 * | 10/2004 | Burger, III | G09F 15/0025 40/538 |
| 7,026,723 | B2 | 4/2006 | Moreno | 290/55 |
| 8,985,477 | B2 * | 3/2015 | Chan | A01G 15/00 239/2.1 |
| 9,555,882 | B2 | 1/2017 | Tanielian | B64C 39/02 |
| 2005/0194121 | A1 | 9/2005 | Ferro | H01L 21/76 |
| 2009/0013596 | A1 | 1/2009 | Wang | F26B 3/32 |
| 2014/0208641 | A1 | 7/2014 | Lee et al. | A01G 15/00 |

FOREIGN PATENT DOCUMENTS

| | | | | |
|---|---|---|---|---|
| CN | 105844547 | | 8/2016 | G06Q 50/08 |
| CN | 105879532 | | 8/2016 | B01D 49/00 |
| CN | 106912338 | | 7/2017 | A01G 15/00 |
| CN | 107321097 | | 11/2017 | B01D 47/06 |
| DE | 35 03 138 | | 8/1986 | A01G 15/00 |
| DE | 197 00 199 | | 7/1998 | B01D 53/00 |
| DE | 102010005441 | A1 * | 7/2011 | A01G 15/00 |
| FR | 2732413 | A1 * | 10/1996 | E01H 13/00 |
| GB | 2563199 | A * | 12/2018 | B01D 46/44 |
| JP | 06-013453 | | 2/1994 | A01G 13/08 |
| JP | 07-115855 | | 5/1995 | A01G 13/06 |
| JP | 09-182532 | | 7/1997 | A01G 13/08 |
| JP | 2007-104904 | | 4/2007 | A01G 15/00 |
| RU | 2093756 | | 10/1997 | F23J 11/00 |
| RU | 2122085 | | 11/1998 | E04F 17/02 |
| RU | 2287691 | | 11/2006 | E21F 1/00 |
| WO | WO 99/54572 | | 10/1999 | E04F 17/02 |
| WO | WO2013/032126 | | 3/2013 | E01H 13/00 |
| WO | WO-2013070254 | A1 * | 5/2013 | A01G 15/00 |
| WO | WO-2014042671 | A1 * | 3/2014 | A01G 15/00 |

OTHER PUBLICATIONS

International Search Report and Written Opinion issued in PCT/US20/29354, dated Sep. 16, 2020, 10 pgs.
International Report on Patentability issued in PCT/US20/29354, dated Sep. 28, 2021, 6 pgs.
Office Action issued in Chinese application No. 202080030453.2, with translation, dated Aug. 9, 2023, 13 pgs.
Supplementary Partial European Search Report issued in EP application No. 20 795 590.7, dated Dec. 7, 2022, 14 pgs.
Supplementary European Search Report issued in EP application No. 20 795 590.7, dated Apr. 3, 2023, 13 pgs.
Office Action issued in Chinese application No. 202080030453.2, with translation, dated Feb. 8, 2023, 18 pgs.

* cited by examiner

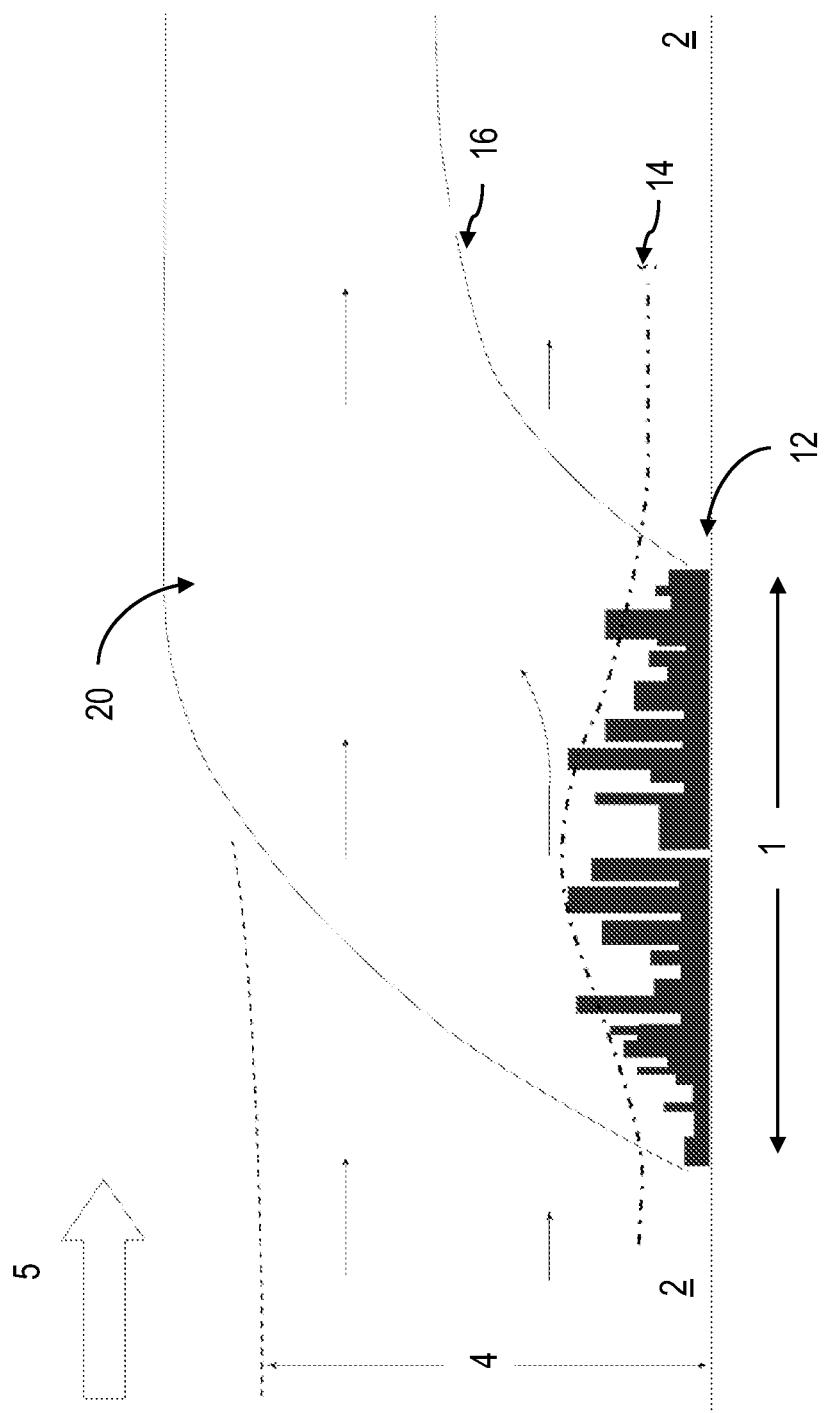

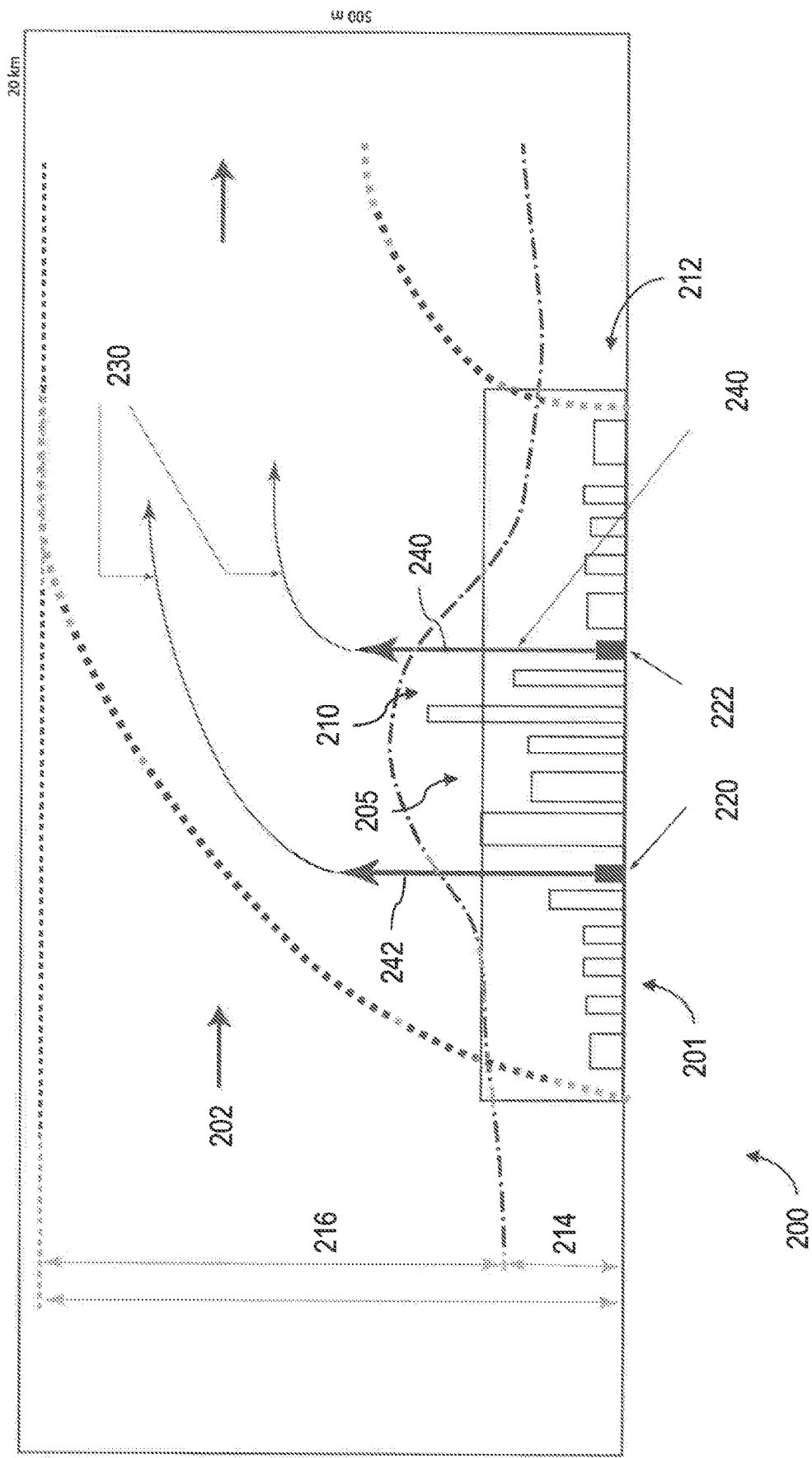

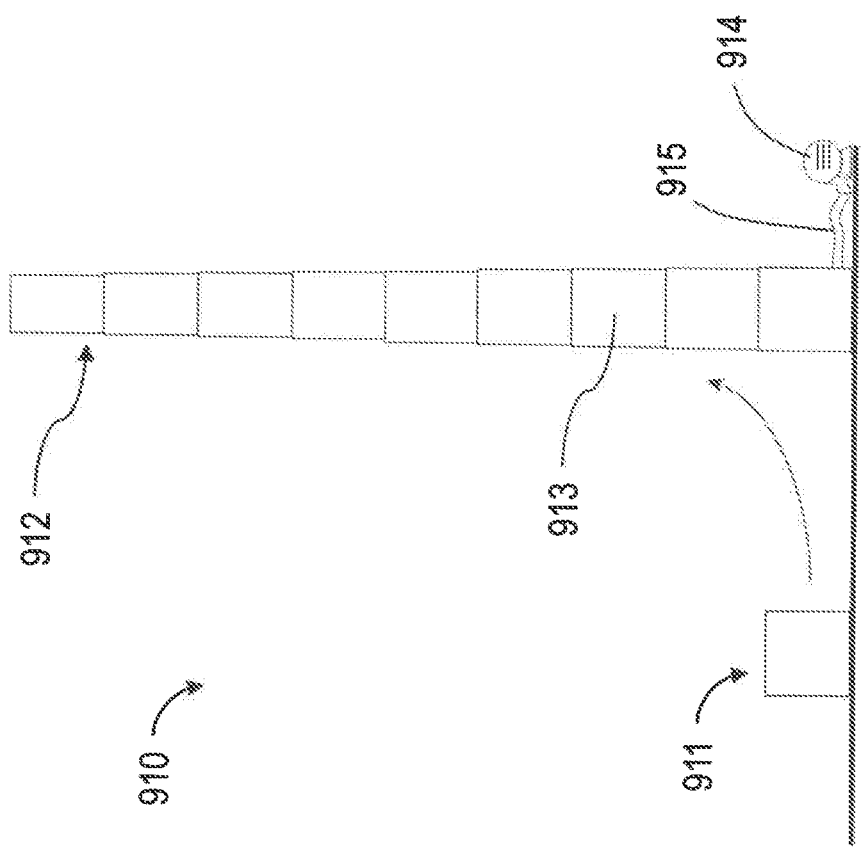

1000

Provide a plurality of turbines within an urban area having an urban surface, a smog atmospheric layer located above the urban surface, and a mixing atmospheric layer located above the smog atmospheric layer
1010

Orient the plurality of turbines to direct a quantity of air between the smog atmospheric layer and the mixing atmospheric layer
1020

Operate the plurality of turbines to move the quantity of air between the smog atmospheric layer and the mixing atmospheric layer
1030

FIG. 10

SMOG REMOVAL BY CITY-SCALE VENTILATION AND CIRCULATION

CROSS REFERENCE TO RELATED APPLICATION

This application claims benefit of U.S. Provisional Application Ser. No. 62/837,116, entitled, "Smog Removal by City-Scale Ventilation and Circulation" filed Apr. 22, 2019, the entire disclosure of which is incorporated herein by reference.

FIELD OF THE DISCLOSURE

The present disclosure is generally related to the field of smog removal and more particularly is related to smog removal on a large scale using ventilation and air circulation.

BACKGROUND OF THE DISCLOSURE

In densely-populated areas, industrial and other human-produced factors as well as natural processes are responsible for high concentrations of chemicals and particulate matter in the air. Known colloquially as smog—a combination of "smoke" and "fog"—this particular matter can be defined as the presence of harmful substances in the atmosphere near the land surface. Common pollutants in smog include sulfur dioxide (SO2), nitrogen oxides (NOx), ozone (O3), particulate matter (small suspended particles of varying sizes), carbon monoxide (CO), and volatile organic compounds (VOCs).

Particulate matter is found in the air in solid and liquid forms. It is measured in total suspended particulates (TSP) of several sizes: PM10, PM2.5, and PM2.1, which describes particulate matter measuring 10 μm (μm=micrometer, or $10^{-6}$ m), in diameter or less, 2.5 μm or less, and 2.1 μm or less, respectively. The smallest particulate matter easily penetrates the respiratory tract, causing health problems. It can also carry chemicals such as metals, polycyclic aromatic hydrocarbons (PAHs), and other pollutants into the lungs.

The persistent haze that is visible in many cities is the polluted air. It usually forms a hectometer thick layer above the land surface. When the weather is cooler, for example in the evening and during the winter months, smog may form over a populated area. Summer time and winter-time days are less prone to standing smog. More than four-fifths of the world's urban population lives in cities whose air quality fails to meet World Health Organization guidelines. Smog has many negative impacts on human health. The World Health Organization (WHO) considers air pollution as one of the greatest environmental risks to our health, with outdoor air pollution causing more than 4 million premature deaths per year. This number has remained nearly constant since 1990. The majority of these deaths are in Asia and Africa.

Current solutions to reduce the negative health effects of smog are severely inadequate. Face masks are commonly worn in highly-polluted cities such as Beijing, China. However, these masks are inconvenient. Cities like Krakow, Poland have deployed large, towering filters to pull pollutants from the air. However, these filters lack sufficient capacity to effectively reduce smog over a large area of population. Some sources of pollutants are equipped with filters or scrubbers, but these may not sufficiently reduce the pollutant output of the sources. And some people are simply advised to remain indoors in filtered-air environments, which is limiting and highly impractical.

Thus, a heretofore unaddressed need exists in the industry to address the aforementioned deficiencies and inadequacies.

SUMMARY OF THE DISCLOSURE

Embodiments of the present disclosure provide a system and method for reducing smog in an urban area. Briefly described, in architecture, one embodiment of the system, among others, can be implemented as follows. A system for reducing smog in an urban area includes an urban area having an urban surface. A smog atmospheric layer is located above the urban surface. A mixing atmospheric layer is located above the smog atmospheric layer. A plurality of turbines is located on the urban surface and moves a quantity of air between the smog atmospheric layer and the mixing atmospheric layer.

The present disclosure can also be viewed as providing a system for reducing smog in an urban area. Briefly described, in architecture, one embodiment of the system, among others, can be implemented as follows. A system for reducing smog in an urban area includes an urban area and a rural area adjacent to the urban area. A plurality of turbines is located within the rural area and/or the urban area, and moves a quantity of air between the urban area and the rural area.

The present disclosure can also be viewed as providing methods of reducing smog in an urban area. In this regard, one embodiment of such a method, among others, can be broadly summarized by the following steps: providing a plurality of turbines within an urban area having an urban surface, a smog atmospheric layer located above the urban surface, and a mixing atmospheric layer located above the smog atmospheric layer; orienting the plurality of turbines to direct a quantity of air between the smog atmospheric layer and the mixing atmospheric layer; and operating the plurality of turbines to move the quantity of air between the smog atmospheric layer and the mixing atmospheric layer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1B is a diagrammatic illustration of urban plume smog over an urban area, in accordance with a first exemplary embodiment of the present disclosure.

FIG. 2A is a diagrammatic illustration of a system for reducing smog in an urban area, in accordance with the first exemplary embodiment of the present disclosure.

FIGS. 9A-9C are illustrations of temporary conduits, in accordance with the first exemplary embodiment of the present disclosure.

FIG. 10 is a flowchart illustrating a method of reducing smog in an urban area, in accordance with the first exemplary embodiment of the present disclosure.

DETAILED DESCRIPTION

Figure 1A:
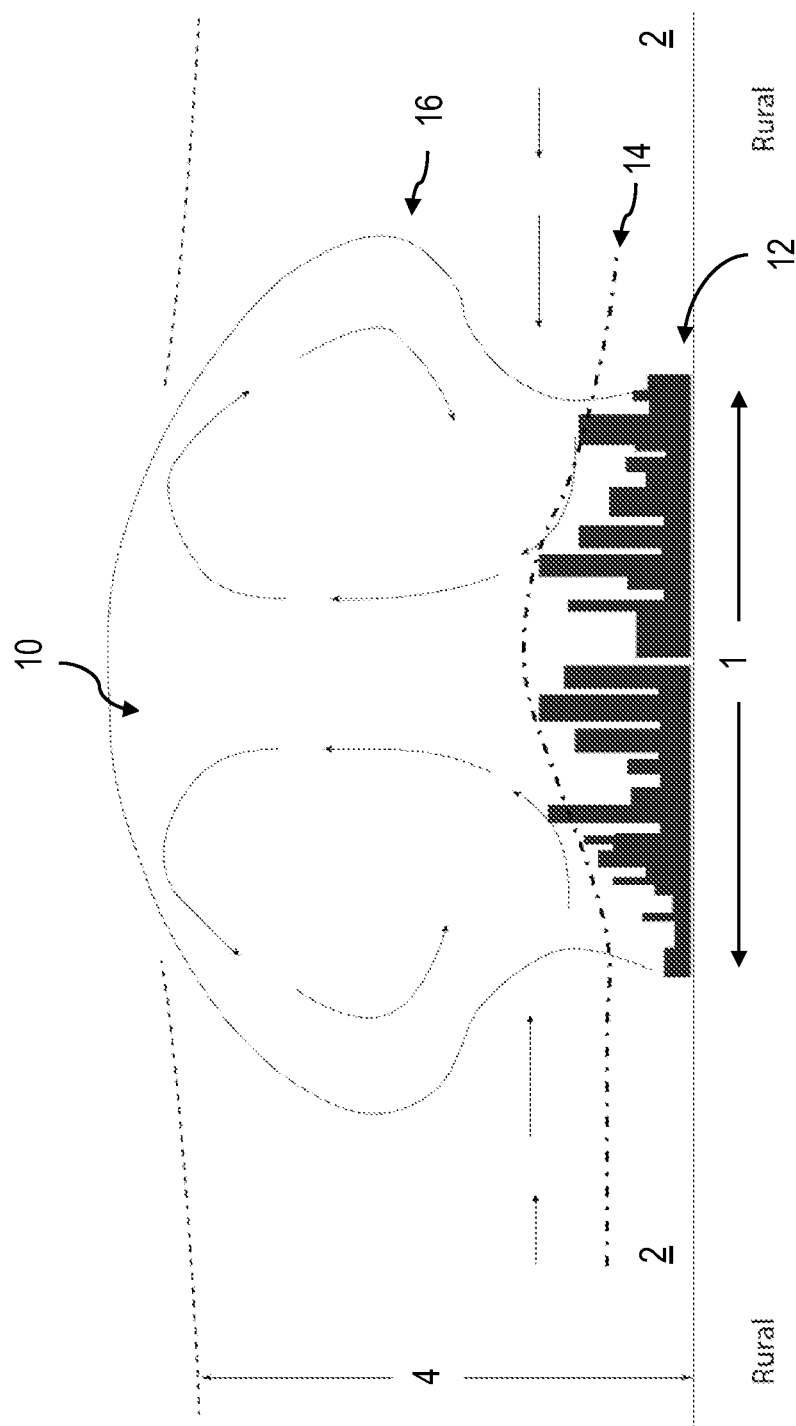
FIG. 1A is a diagrammatic illustration of urban dome smog over an urban area, in accordance with a first exemplary embodiment of the present disclosure.

Cities generate heat and depending on whether ambient wind exists or not, we can distinguish two types of atmospheric structures over a city: an urban dome that forms when there is no ambient wind and an urban plume that forms when there is ambient wind present. They extend up to an urban boundary layer (UBL) that converges with a rural boundary layer (rural BL or RBL), which may extend 500 meters or more above the surface of the urban area. FIG. 1A is a diagrammatic illustration of urban dome smog 10 over an urban area 1, in accordance with a first exemplary embodiment of the present disclosure. FIG. 1B is a diagrammatic illustration of urban plume smog 20 over an urban area 1, in accordance with a first exemplary embodiment of the present disclosure. The urban area 1 may include an urban surface 12, smog atmospheric layer 14, and mixing atmospheric layer 16. A rural area 2 may be adjacent to the urban area 1. The urban area 1 may include a city, town, village, campus, or other area where urban buildings generate or collect smog 10, 20. The rural area 2 may be located adjacent to, but substantially outside of, the urban area 1. The rural area may be defined by city or town limits, a marked change in the density of buildings and other structures, or a marked change in the density of accumulated urban dome or urban plume smog 10, 20. In one example, the transition between urban and rural areas 1, 2 may be gradual; an urban area 1 may gradually become a rural area 2. In general, the urban area 1 may be considered the geographic area wherein a sufficient amount of smog 10, 20 has originated.

The urban area 1 may include an urban surface 12, smog atmospheric layer 14, and mixing atmospheric layer 16. The urban surface 12 may be a horizontal surface located at the ground or base level of the urban area 1. The smog atmospheric layer 14 may be a layer of smog extending above the urban surface 12 any dimension. The smog atmospheric layer 14 may be vertically adjacent to the urban surface 12 and may extend above the urban surface 12 with a vertical thickness. The smog atmospheric layer 14 is the layer closest to the urban surface 12 in which there is vigorous turbulent mixing. However, the smog atmospheric layer 14 does not mix easily with the mixing atmospheric layer 16. That lack of mixing results in the accumulation of pollutants in the smog atmospheric layer 14, particularly when there is no ambient wind, during winter time, at night, and during the day (also known as photochemical smog).

In the urban dome shown in FIG. 1A, the warm urban area air rises, and at or below the height of the RBL 4, it moves horizontally away from the urban area 1. The air then comes down at the edges of the urban area 1 and moves towards the urban area 1 above the urban surface 12. This circulation forms a convection cell that continuously moves air around. In the urban plume scenario shown in FIG. 1B, the urban area air rises and then it is taken by ambient wind 5 and moved away from the urban area 1. More severe smog may form under the urban dome conditions in FIG. 1A because the polluted urban air is not removed, but merely circulated. Less severe smog may exist under the urban plume scenario in FIG. 1B. Other factors, such as season, time of day, temperature and the vertical structure of the atmosphere (thermal inversion) also play important roles and further complicate urban air circulation.

Figure 2B:
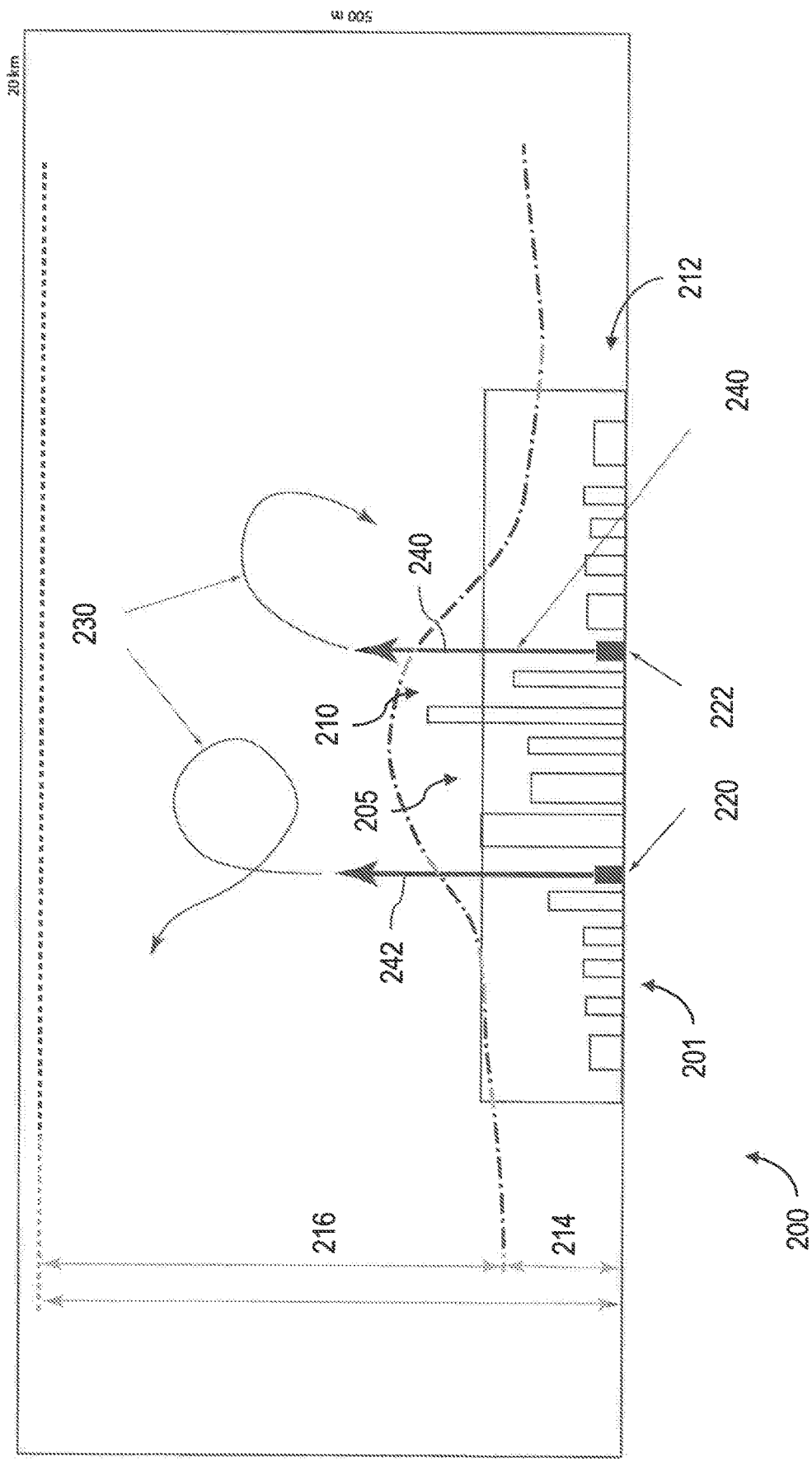
FIG. 2B is a diagrammatic illustration showing the system of FIG. 2A in an urban dome scenario, in accordance with the first exemplary embodiment of the present disclosure.

FIG. 2A is a diagrammatic illustration of a system 200 for reducing smog 210 in an urban area 201, in accordance with the first exemplary embodiment of the present disclosure. FIG. 2A shows the system 200 operating in the urban plume scenario shown in FIG. 1B, above. FIG. 2B shows the system 200 operating in the urban dome scenario shown in FIG. 1A, above. FIGS. 2A and 2B are discussed together below, unless otherwise stated.

The system 200 includes an urban area 201 having an urban surface 212. A smog atmospheric layer 214 is located above the urban surface 212. A mixing atmospheric layer 216 is located above the smog atmospheric layer 214. A plurality of turbines 220, 222 are located on the urban surface 212 and move a quantity air 230 between the smog atmospheric layer 214 and the mixing atmospheric layer 216.

The turbines 220, 222 may be any devices suitable for moving a sufficient quantity of air 230. The turbines 220, 222 may include pumps, fans, wind turbines, and the like. The turbines 220, 222 may be distributed throughout the urban surface 212. In one example, the turbines 220, 222 may be located nearest to sources of smog 210 in the urban area 201. The turbines 220, 222 may be concentrated near those sources in order to move the most smog 210 allowable. In another example, the turbines 220, 222 may be distributed so as to create a particular air flow scheme throughout the urban area 201. For instance, if wind 202 (shown in FIG. 2A) naturally blows through certain paths within the urban area 201, the turbines 220, 222 may be distributed to optimally direct air 230 into the path of the wind 202. As another example, the turbines 220, 222 may be located near the tallest structures 205 within the urban area 201, which may allow the turbines 220, 222 to move an optimal quantity of air 230 away from those structures. In yet another example, the turbines 220, 222 may be evenly distributed throughout the urban area 201.

Figure 3:
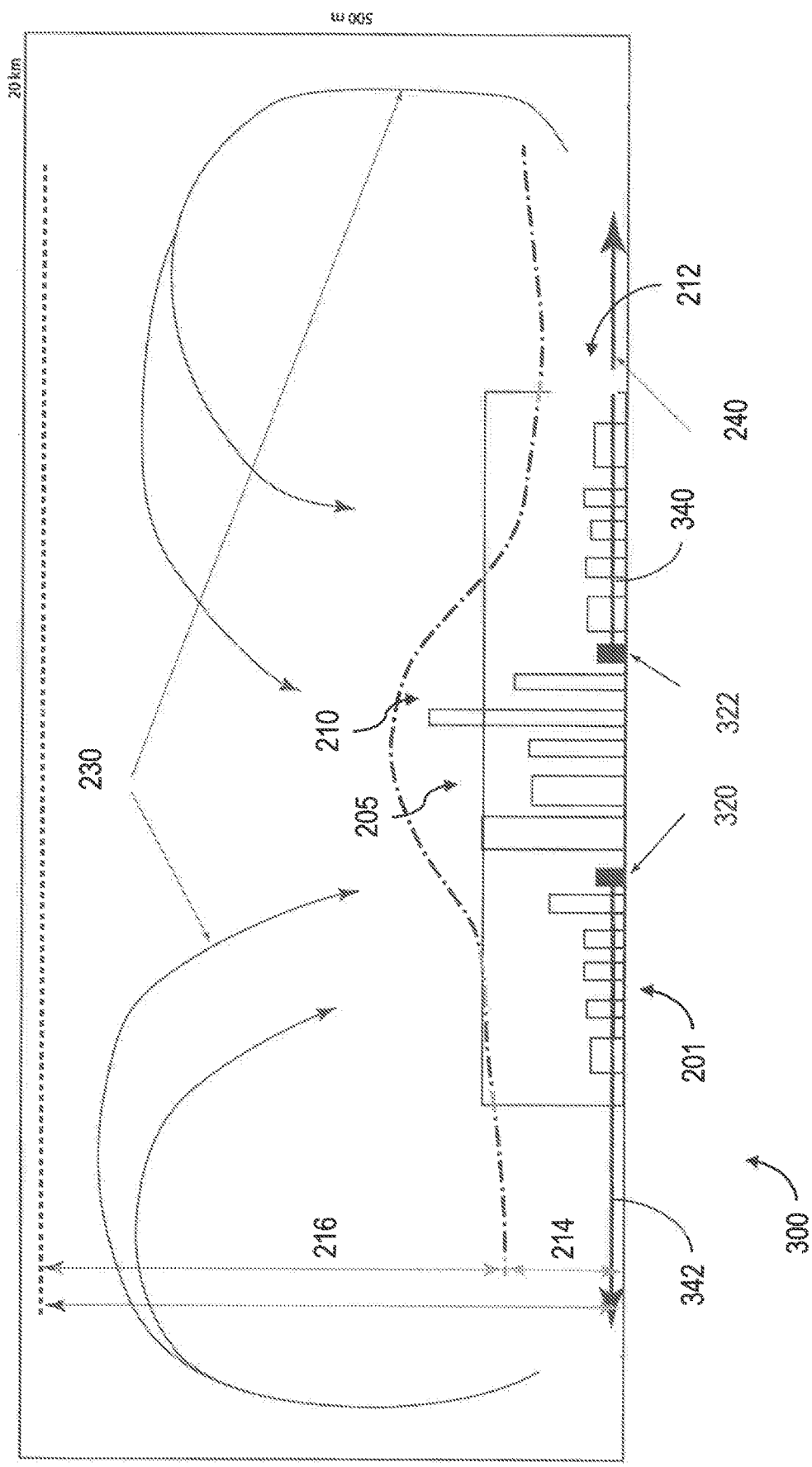
FIG. 3 is a diagrammatic illustration of a system for reducing smog in an urban area, in accordance with the first exemplary embodiment of the present disclosure.

The turbines 220, 222 may be oriented to move a quantity of air 230 between the smog atmospheric layer 214 and the mixing atmospheric layer 216. As shown in FIGS. 2A, 2B, this orientation may direct air 230 in a substantially upward direction. As shown in FIG. 3, below, this orientation may direct air 230 in a substantially horizontal direction away from the urban area 201. In one example, a number of the plurality of turbines 220, 222 may direct the air 230 in a horizontal direction within the urban area 201, while others direct the air 230 in a vertical direction. This may allow the turbines 220, 222 to focus the smog 210 to locations within the urban area 201 that will more optimally dilute or remove the smog from the urban area 201. The orientation of the turbines 220, 222 may depend on the geography or topography of the urban area 201, structures within the urban area 201, natural weather patterns, local seasonal climate, and the like. In one example, the turbines 220, 222 may be oriented to prevent smog from being moved through a particular area, such as a school or hospital.

In one example, the turbines 220, 222 may include one or more air conduits 240, 242 to guide the air 230 upward. This may allow the turbines 220, 222 to be oriented in a non-vertical direction, which may allow optimal collection of smog at urban surface 212. The turbines 220, 222 may be in communication with the air conduits 240, 242 and may direct air 230 from the turbines 220, 222 through the air conduits 240, 242, and into the mixing atmospheric layer 216. The air conduits 240, 242 may be permanent or temporary installations. For example, the air conduits 240, 242 may be chimneys, pipes, or other channels that are permanently located within the urban area 201. The permanent air conduits 240, 242 may be freestanding or affixed to a building, post, or other infrastructure. For instance, a standard industrial chimney may be used. In another example, the air conduits 240, 242 may be temporary. For instance, the air conduits 240, 242 may be inflatable tubes that become vertical and semi-rigid when air 230 is moved through them. They may operate at particular times, for instance, during the night or during times of heavy smog. When not in use, they may be deflated and stored away. The temporary air conduits 240, 242 may be made of any suitable materials, including plastic, vinyl, fabric, paper, or any combination thereof. In another example, the air conduits 240, 242 may be made from telescoping segments of specific height. The segments may fit together and may be telescopically extendable when in use. In another example, the air conduits 240, 242 may be rigid conduits, such as those made from plastic, metal, polymer, and the like. The rigid air conduits may be temporarily affixed to a support structure while the system 200 is in use. The air conduits 240, 242 may extend above the smog atmospheric layer 214 and into the mixing atmospheric layer 216, such that a top opening of the air conduits 240, 242 can expel air into the mixing atmospheric layer 216.

The turbines 220, 222 may move a quantity of air 230 between the smog atmospheric layer 214 and the mixing atmospheric layer 216. The turbines 220, 222 may move or draw air from a portion of the smog atmospheric layer 214 proximate to the ground surface, which is generally an area of the urban setting which is open to the outside atmosphere and has smog. The turbines 220, 222 may then direct smog 210 or air 230 within the smog atmospheric layer 214 upward and into the mixing atmospheric layer 216. The turbines 220, 222 may direct the smog 210, air 230, or some combination thereof by moving air 230 within the urban area 230 between the smog atmospheric layer 214 and the mixing atmospheric layer 216. As air 230 is moved between the smog atmospheric layer 214 and the mixing atmospheric layer 216, the smog 210 may be directed higher into the mixing atmospheric layer 216. As shown in FIG. 2A, at greater heights, wind 202 may blow over the urban area 201 at the mixing atmospheric layer 216 and may carry the smog 210 away from the urban area. As shown in FIG. 2B, where there is little wind, the pollutants in the smog 210 may mix with the moved air 230 in the mixing atmospheric layer 216. This may cause the smog 210 from the smog atmospheric layer 214 to be mixed and diluted within the mixing atmospheric layer 216 at a higher altitude over the urban area 201. Over time in both scenarios, the amount of smog 210 in the urban area 201 may be reduced.

FIG. 3 is a diagrammatic illustration of a system 300 for reducing smog 210 in an urban area 201, in accordance with a second exemplary embodiment of the present disclosure. The system 300 may be deployed in an urban area 201 having an urban surface 212, smog atmospheric layer 214, mixing atmospheric layer 216, and structures 205, as shown in FIGS. 2A-2B, above. The system 300 may include a plurality of turbines 320, 322 located on the urban surface 212 within the urban area 201, as shown in FIGS. 2A-2B. In FIG. 3, the plurality of turbines 320, 322 may be oriented to move a quantity of air 230 between the smog atmospheric layer 214 and the mixing atmospheric layer 216 by directing air 230 generally horizontally and outside of the urban area 201.

The plurality of turbines 320, 322 may be distributed within the urban area 201 and may work individually or in concert to direct air 230 outside of the urban area 201. As discussed relative to FIGS. 2A-2B above, the plurality of turbines 320, 322 may be distributed in a variety of different ways to optimize and direct the air 230 being moved through the urban area 201, for instance, in proximity to sources of pollutants, in strategic pathways or areas where smog may be carried away efficiently, or positioned to avoid certain areas of the urban area 201. The plurality of turbines 320, 322 may include air conduit 340, 342 in communication with the turbines 320, 322. The air conduit 340, 342 may direct the smog 210, air 230, or a combination of thereof outside of the urban area 201. The air conduit 340, 342 may be permanent or temporary, as discussed above. In one example, the air conduit 340, 342 may be located on or above the urban surface 212. In another example, the air conduit 340, 342 may be located underneath the urban surface 212, for instance, as a buried pipeline or conduit. The buried conduit may surface outside or near the outside of the urban area 201. Existing infrastructure, such as tunnels, sewer lines, metro tunnels, and the like may also be used as air conduit 340, 342 for the smog 210.

In operation, pollutants, air 230, or smog 210 may be moved from within the urban area 201, for example within the smog atmospheric layer 214, to an area outside of the urban area 201. The horizontal movement of this air 230 or smog 210 may cause low pressure over the urban area 201, which may cause air 230 in the mixing atmospheric layer 216 to move into the smog atmospheric layer 214. This may in turn cause the air 230 moved by the turbines 320, 322 to rise outside of the urban area 201 and be drawn into the mixing atmospheric layer 216 in a circular motion. Over time, the pollutants from the air 230 in the smog atmospheric layer 214 may move between the smog atmospheric layer 214 and the mixing atmospheric layer 216, diluting the amount of smog in the air above the urban area 201. This may reduce smog 210 within the urban area 201.

In another example, the system shown in FIG. 3 may operate in the opposite direction, drawing air 230 from outside of the urban area 201 and moving it into the urban area 201. The air 230 from outside the urban area 201 may be clean air. As it is moved into the urban area 201, it may force the smog 210 within the smog atmospheric layer 214 upward and into the mixing atmospheric layer 216. This may dilute the concentration of pollutants in the smog atmospheric layer 214, reducing smog 210 within the urban area 201.

Figure 4:
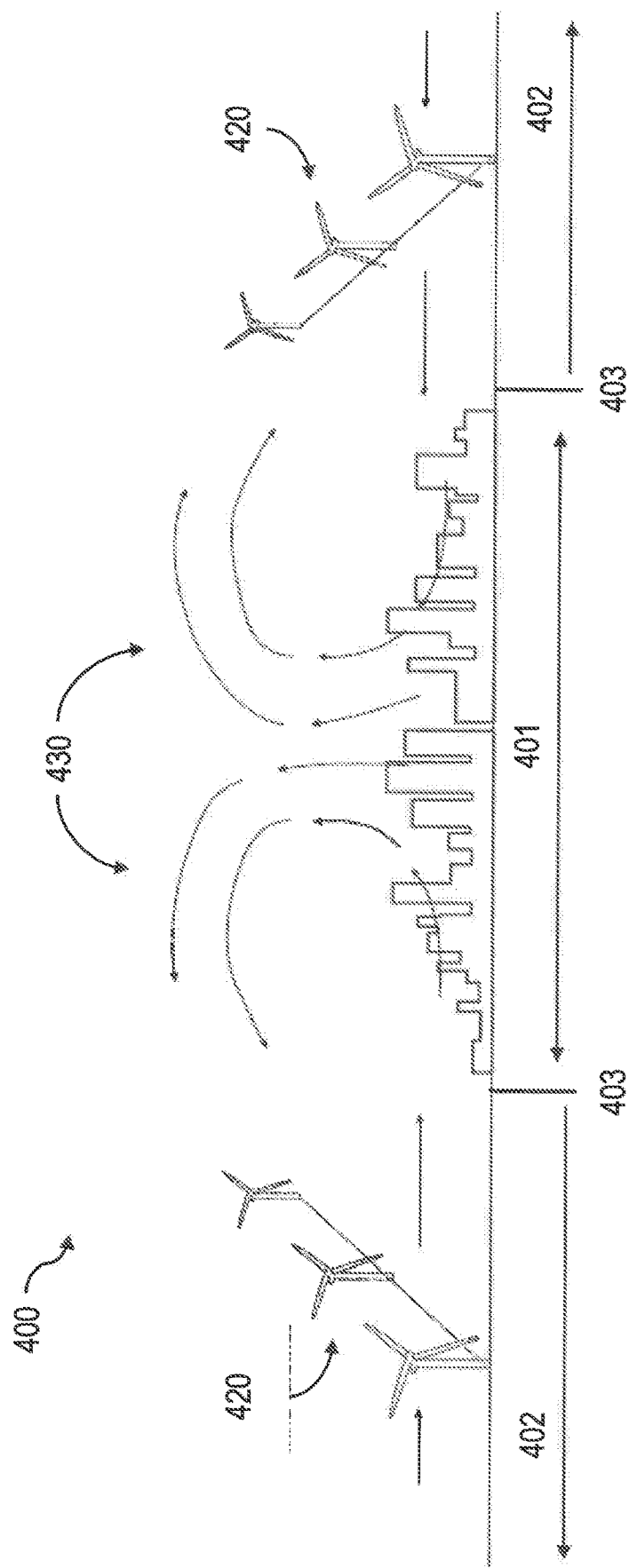
FIG. 4 is a diagrammatic illustration of a system for reducing smog in an urban area, in accordance with a second exemplary embodiment of the present disclosure.

FIG. 4 is a diagrammatic illustration of a system 400 for reducing smog in an urban area, in accordance with the second exemplary embodiment of the present disclosure. The system 400 includes an urban area 401 and a rural area 402 adjacent to the urban area 401. A plurality of turbines 420 is located within the rural area 402 and moves a quantity of air 430 between the urban area 401 and the rural area 402.

The urban area 401 may be any city, town, village, campus, or other developed area where smog may originate from or settle, as described in FIGS. 1A-3, above. The rural area 402 may be the area adjacent to, but outside of, the urban area 401. In FIG. 4, the rural area 402 is shown as being demarcated by an urban boundary 403. This is for illustrative purposes only. In operation, the urban boundary 403 may not be a physical boundary, but may simply be a geographical point where the urban area 401 ends and the rural area 402 begins. As discussed relative to FIGS. 1A-1B, above, the urban boundary 403 may be the point where urban structures within the urban area 401 are not present or fall below a certain density. In another example, the urban boundary 403 may be the point where the density of smog falls below a threshold. For instance, the urban area 401 may be an area where 95% of localized smog is located; the urban boundary 403 may be the geographical location where the 95% threshold is met; and the rural area 402 may be the localized area immediately outside of the urban boundary 403.

A plurality of turbines 420 is located within the rural area 402 and moves a quantity of air 430 between the urban area 401 and the rural area 402. The turbines 420 may be any suitable devices for moving a quantity of air 430, including wind turbines, air pumps, fans, and the like. For instance, large-scale wind turbines used to generate renewable energy, such as those made by Acciona®, Siemens Gamesa®, and the like, may be used. These turbines may be powered by electricity, rather than generating it, in order to turn the rotors and move a sufficient quantity of air. A large Siemens® wind turbine has a sweep area of approximately 10,000 square meters and is rated to work with wind speeds of tens of meters per second. Operating it to generate wind, and taking a conservative wind speed of 10 m/s, the turbine may move 100,000 cubic meters per second. Air having a volume of 10 billion cubic meters may be moved by approximately one or two such turbines operating over the course of a day. A plurality of such wind turbines may be used to maintain air flow in the desired direction. In another example, a plurality of smaller wind turbines with a sweep area of 1,000 square meters may be used instead of fewer large ones. This may be advantageous in that the plurality of smaller turbines can be individually controlled—for example switched on when needed or oriented according to ambient pressure and wind condition. Another advantage would be that because of their smaller sizes they would be less visible and thus aesthetically less displeasing. The sweep area of the plurality of turbines may be larger or smaller than 1,000 square meters, depending on the turbines used. For instance, turbines with a sweep area of up to 2,000 square meters may be used in one implementation, while turbines with a sweep area of down to 500 square meters may be used in another implementation. Any turbine with a suitable sweep area may be used. In one example, a combination of turbines having different sweep areas may be used. For instance, where more air must be moved, a larger turbine may be used. In locations where less air must be moved, one or more smaller turbines may be used. This may allow air to be directed efficiently within the area. In another example, a high-bypass turbofan engine, such as those used to power the Boeing® 747, may be used to move a sufficient quantity of air. Such an engine can pump approximately 1,000 cubic meters of air per second. Approximately 115 engines may be able to pump the quantity of air within a 10 billion cubic meter volume in a day. In another example, a Rietz® high-volume air pump having a maximum flow rate of 667 cubic meters per second may be used. Approximately 175 pumps may be able to pump 10 billion cubic meters of air within a day. Other types of turbines, pumps, or fans may be considered within the scope of this disclosure.

The plurality of turbines 420 may be distributed within the rural area 402. The distribution may be determined by the number and capacity of the turbines 420, the geographical characteristics of the rural area 402, the natural weather or climate patterns in the area, and the like. In one example, the plurality of turbines 420 may be distributed to create artificial circulation around and through the urban area 401. As shown in FIG. 4, the plurality of turbines 420 may be located and distributed in order to direct air 430 from the rural area 402 into the urban area 401. The air 430 may be moved by the plurality of turbines 420 from the rural area 402 to the urban area 401, causing air 430 in the urban area 401 to rise higher in the atmosphere. The rising air 430 may contain smog. After rising, the smog may mix with clean air 430 above the urban area 401, diluting the smog and reducing the smog in the urban area 401.

Figure 5:
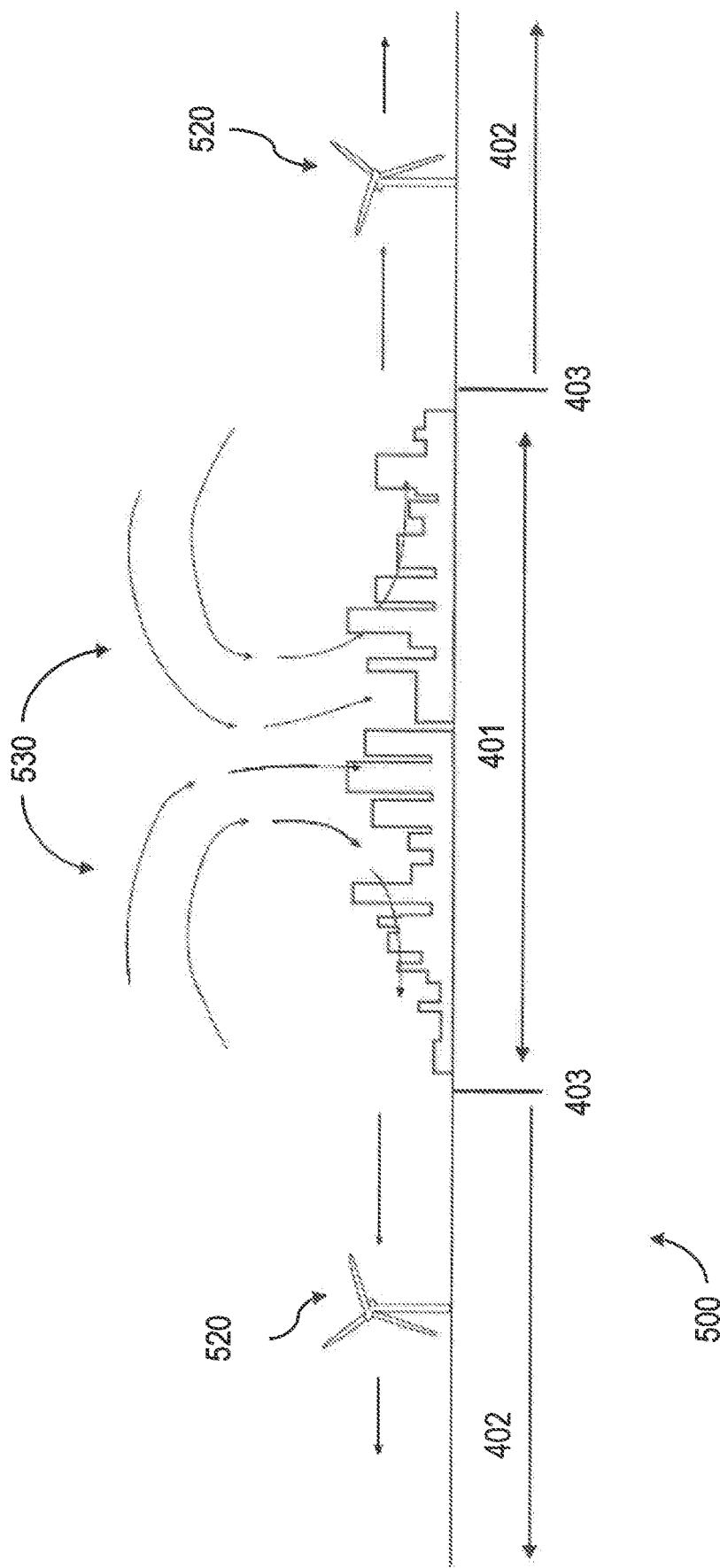
FIG. 5 is a diagrammatic illustration of a system for reducing smog in an urban area, in accordance with the second exemplary embodiment of the present disclosure.

FIG. 5 is a diagrammatic illustration of a system 500 for reducing smog in an urban area 401, in accordance with the second exemplary embodiment of the present disclosure. The system 500 may include an urban area 401, rural area 402, and urban boundary 403, as discussed in FIG. 4, above. A plurality of turbines 520 may be located within the rural area 402 and may be configured to move a quantity of air 530 between the urban area 401 and the rural area 402. As shown in FIG. 5, the plurality of turbines 520 may be facing away from the urban area 401, drawing air 530 from the urban area 401 into the rural area 402. The air 530 from the urban area 401 may contain smog, which may be moved from the urban area 401 to the rural area 402. The resulting low pressure may cause clean air 530 from higher in the atmosphere to be drawn into the urban area 401. This may reduce the smog in the urban area 401.

Figure 6:
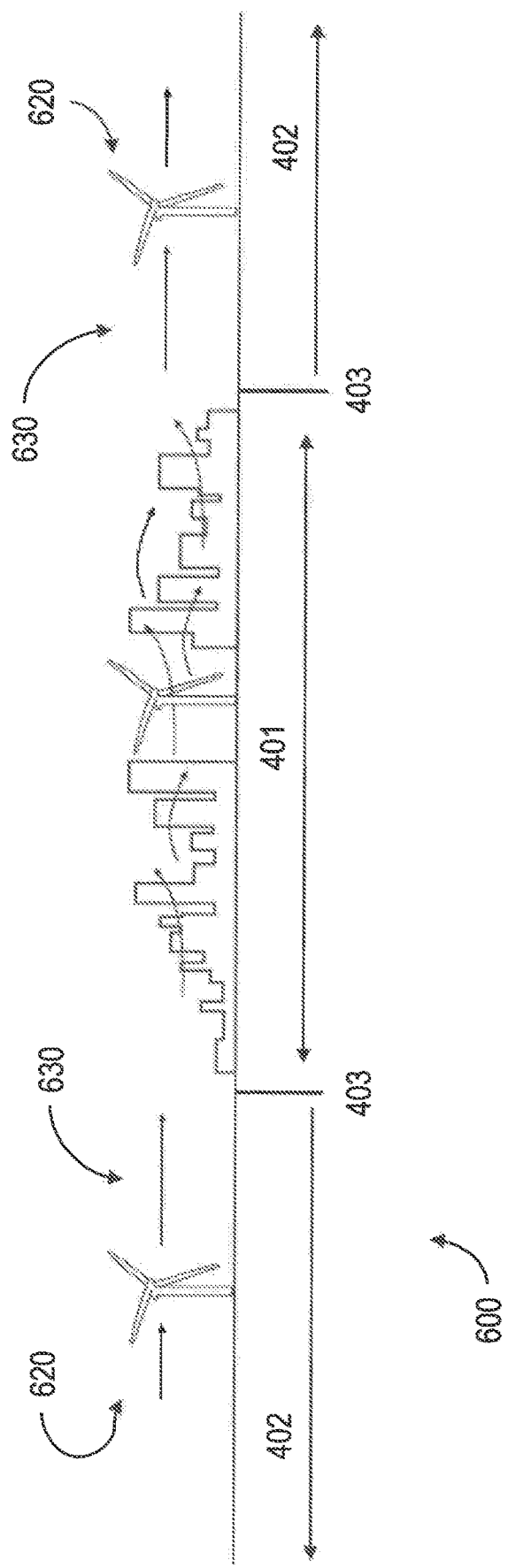
FIG. 6 is a diagrammatic illustration of a system for reducing smog in an urban area, in accordance with the second exemplary embodiment of the present disclosure.

FIG. 6 is a diagrammatic illustration of a system 600 for reducing smog in an urban area 401, in accordance with the second exemplary embodiment of the present disclosure. The system 600 may include an urban area 401, rural area 402, and urban boundary 403, as discussed in FIG. 4, above. A plurality of turbines 620 may be located within the rural area 402 and may be configured to move a quantity of air 630 between the urban area 401 and the rural area 402. As shown in FIG. 6, the plurality of turbines 620 may be positioned to direct air 630 to circulate through the urban area 401. As illustrated in FIG. 6, directing air 630 through the urban area 401 may include directing the air 630 in a substantially straight path from one point of longitude or latitude to another point. In another example, this may include directing the air 630 along a plurality of paths through the urban area 401 and back into the rural area 402. This may depend on the size and layout of the urban area 401, the location and placement of the plurality of turbines 620, natural weather patterns, and other factors. The system 600 may artificially generate wind originating in one portion of the rural area 402, moving through the urban area 401, and moving back into a second portion of the rural area 402.

As the air is moved from the rural area 402 to the urban area 401 and back to the rural area 402, it may cause smog from the urban area 401 to be moved from the urban area 401 to the rural area 402. This may reduce the smog within the urban area 401.

Figure 7:
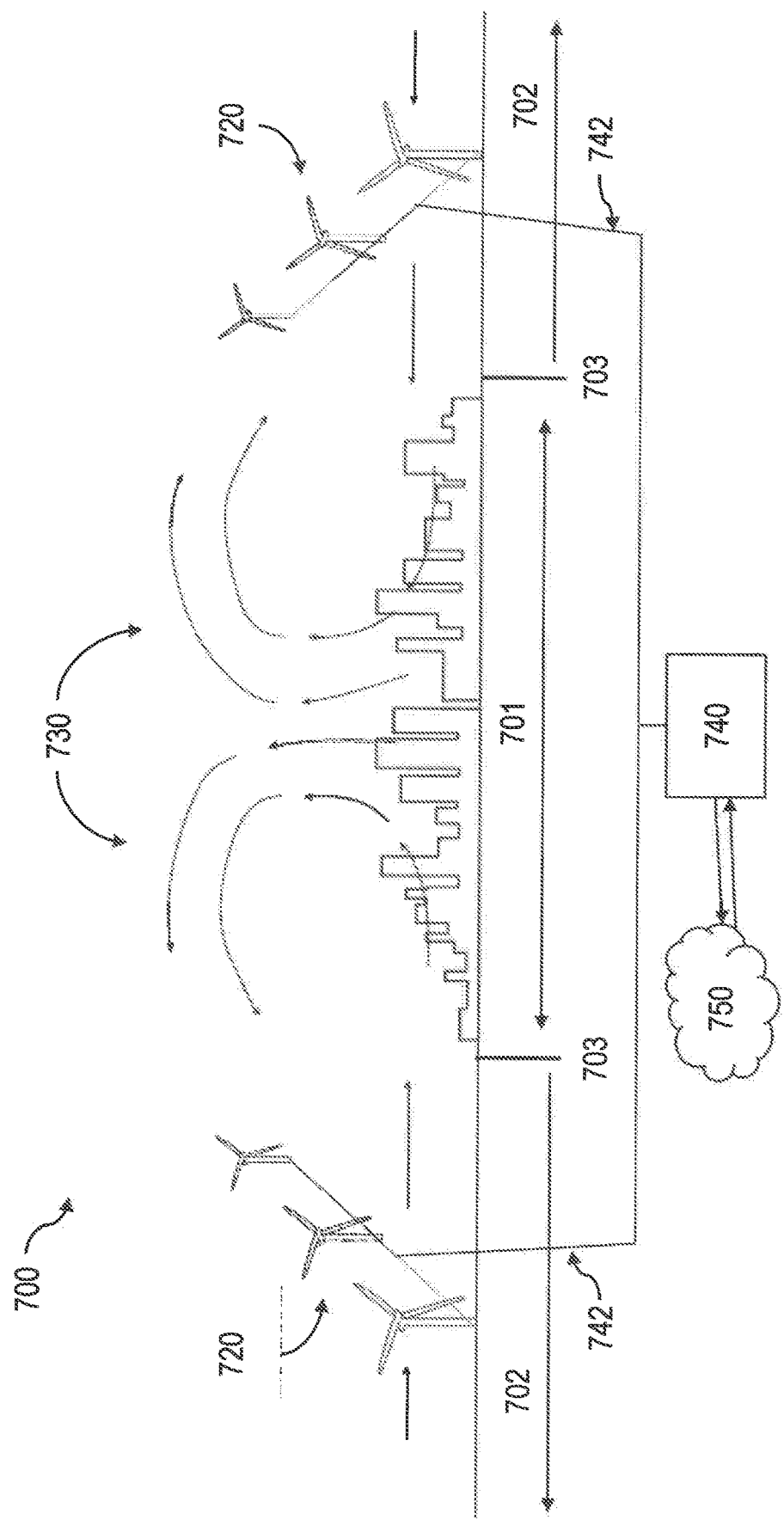
FIG. 7 is a diagrammatic illustration of a computer-controlled system for reducing smog in an urban area, in accordance with the first and second exemplary embodiments of the present disclosure.

FIG. 7 is a diagrammatic illustration of a computer-controlled system 700 for reducing smog in an urban area 701, in accordance with the first and second exemplary embodiments of the present disclosure. As shown, the plurality of turbines 720 may be operated and controlled using a computer system 740. The computer system 740 may be in electrical communication with the plurality of turbines 720 over at least one network 742. The at least one network 742 may be any suitable network, including wired connections such as local area networks, wide area networks, intranets and wireless connections such as radio, Wi-Fi®, satellite, Bluetooth®, and the like. The at least one network 742 may be connected to the Internet, and may be operable remotely. The computer system 740 may include one or more computers, servers, or distributed computing devices, which may be in communication with a cloud computing network 750 or similar network which may compile, analyze, and/or distribute data relating to turbines in other locations.

In one example, the computer system 740 may automatically control the operation of the plurality of turbines 720 based on the local topology, instant wind conditions, predicted weather conditions, amount of smog to be moved, and the like. For instance, local or remote sensors may measure the current wind conditions to be stronger in a first portion of the rural area 702 and weaker in a second, different portion of the rural area 702. The computer system 740 may use the sensor information to control the operation of turbines 720 in the first and second portions of the rural area 702 differently. For instance, where the wind conditions are stronger, the computer system 740 may operate the turbines 720 at a lower level or over a shorter period. Where the wind conditions are weaker, the computer system 740 may operate the turbines 720 at a higher level or over a longer period. As another example, a sensor within the urban area 701 may detect and report higher concentrations of smog in a first portion of the urban area 701 and lower concentrations of smog in a second portion of the urban area 701. The computer system 740 may direct turbines 720 in connection with the first portion of the urban area 701 to operate at a higher level or for a more sustained period than turbines 720 in connection with the second portion of the urban area 701. The computer system 740 may direct the turbines 720 in different portions of the rural area 702 to operate differently based on any one or more factors. The computer system 740 may control turbines 720 individually or in one or more groups. The computer system 740 may be used with any of the turbines, fans, or other air movers described relative to FIGS. 2A-6, or otherwise within this disclosure.

Figure 8B:
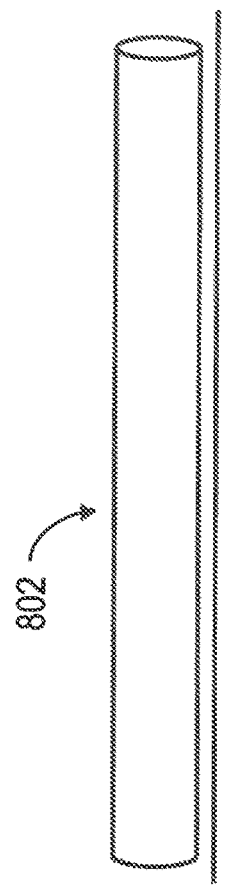
FIGS. 8A-8B are illustrations of permanent air conduits, in accordance with the first exemplary embodiment of the present disclosure.
Figure 8A:
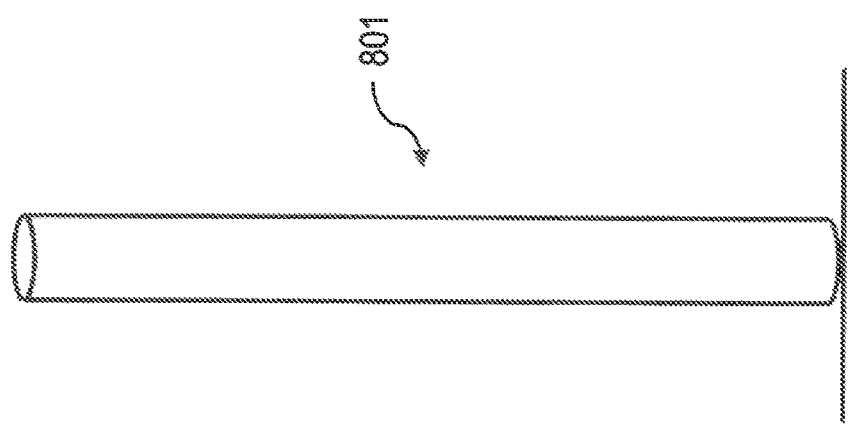

FIGS. 8A-8B are illustrations of permanent air conduits 801, 802, in accordance with the first exemplary embodiment of the present disclosure. In FIG. 8A, the air conduit 801 is positioned vertically to direct air upward. The air conduit 801 may operate with the system 200 shown in FIGS. 2A-2B. In FIG. 8B, the air conduit 802 is positioned horizontally to direct air outward from an urban area. The air conduit 802 may operate with the system 300 shown in FIG. 3. The air conduits 801, 802 may be any suitable length for directing air between the urban area and the rural areas of FIGS. 1A-7. In one example, a plurality of air conduits 801, 802 may be used to direct the air.

Figure 9B:
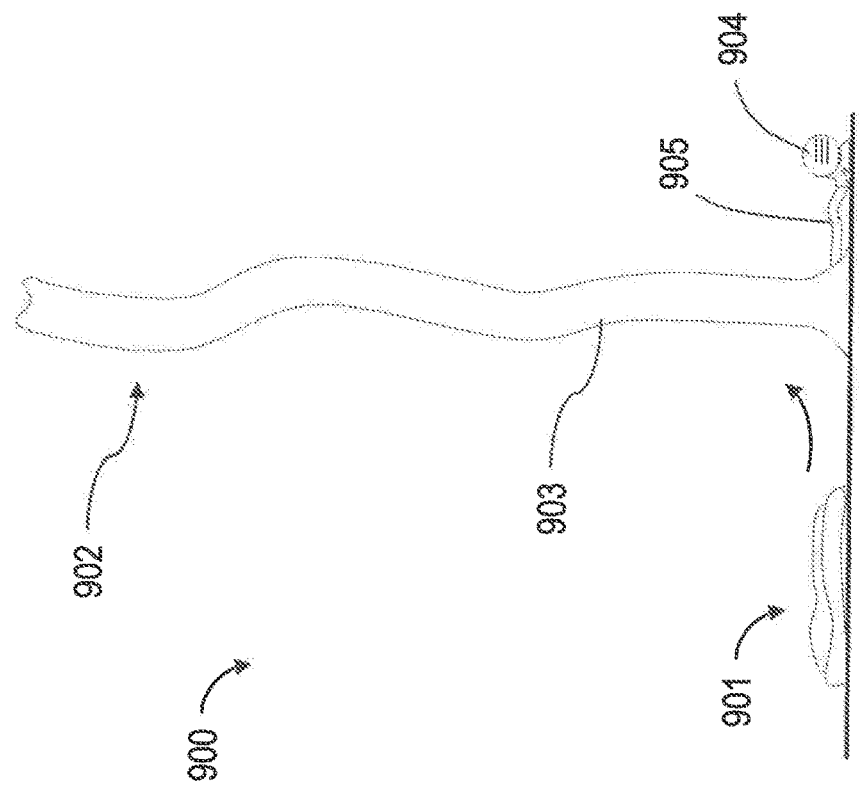
Figure 9A:
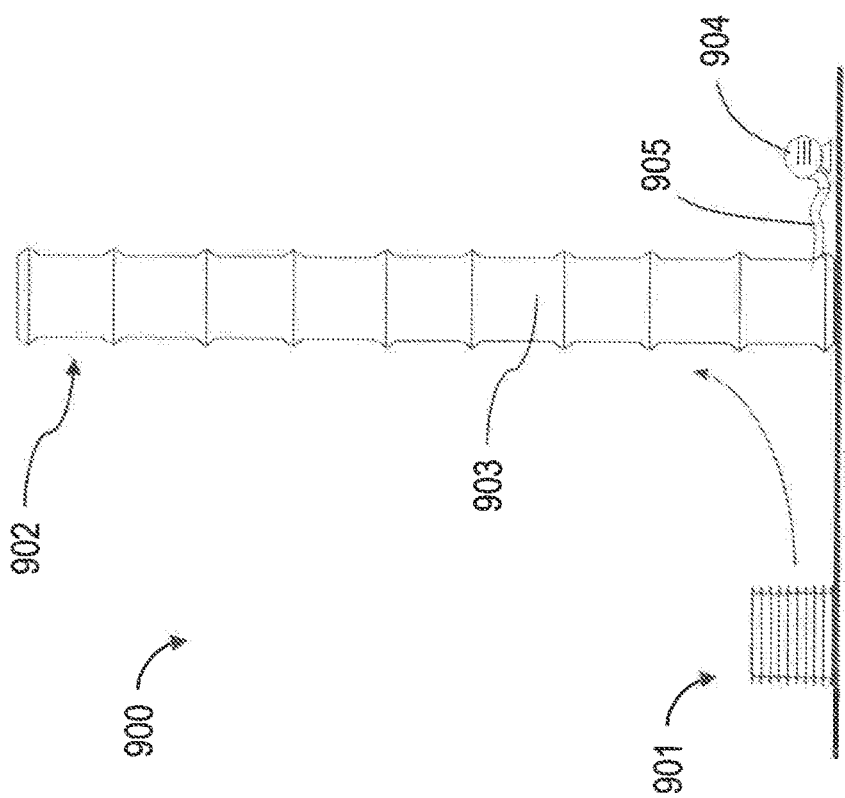

FIGS. 9A-9C are illustrations of temporary conduits 900, 910, in accordance with the first exemplary embodiment of the present disclosure. In FIG. 9A, the conduit 900 may be a collapsible conduit made from fabric, synthetic materials, plastics, and the like. When not in use, the conduit 900 may be in a retracted state 901, and when a positive air pressure is applied with an air pump 904 or similar device connected to the conduit 900 with a transfer hose 905, the conduit 900 converts to an expanded state 902. The structure of the conduit 900 may provide a semi-rigid guide for the air within. The conduit 900 may be comprised of a plurality of segments 903 connected together. FIG. 9B illustrates a similar example, where the conduit 900 is formed from a flexible fabric or fabric-like material having a tube-like shape. The conduit 900 may have a naturally deflated state 901, and when a positive air pressure is applied with an air pump 904 or similar device connected to the conduit 900 with a transfer hose 905, the conduit 900 converts to an expanded state 902. The continuous or semi-continuous positive air pressure from the air pump 904 maintains the expanded state 902 and also transfers surface air through the conduit 900. FIG. 9C illustrates a similar design, where the conduit 910 may be a telescoping conduit made from rigid or semi-rigid plastics, polymers, metals, and the like. When not in use, the conduit 910 may be in a retracted state 911. When a positive air pressure is applied with an air pump 914 or similar device connected to the conduit 910 with a transfer hose 915, the conduit 910 converts to an expanded state 902. When this occurs, the plurality of segments 913 that fit together may be telescopically extended into an expanded state 912. The structure of the conduit 910 may provide a rigid guide for the air within. The plurality of segments 913 may be held in the expanded state 912 by friction, locking mechanisms, or other means. The plurality of segments 913 may nest when in the retracted state 911.

FIG. 10 is a flowchart 1000 illustrating a method of reducing smog in an urban area, in accordance with the first exemplary embodiment of the present disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 1010 includes providing a plurality of turbines within an urban area having an urban surface, a smog atmospheric layer located above the urban surface, and a mixing atmospheric layer located above the smog atmospheric layer. The plurality of turbines may be located within the urban area as described relative to FIGS. 2A-3, above.

Step 1020 includes orienting the plurality of turbines to direct a quantity of air between the smog atmospheric layer and the mixing atmospheric layer. The plurality of turbines may be oriented as described relative to FIGS. 2A-3, above. The plurality of turbines may be oriented to direct the quantity of air in a substantially vertical, upward direction, in a substantially horizontal outward direction, in a substantially horizontal inward direction, or some combination thereof.

Step 1030 includes operating the plurality of turbines to move the quantity of air between the smog atmospheric layer and the mixing atmospheric layer. The plurality of turbines may operate to move the quantity of air. Depending on the orientation of the turbines, the quantity of air may move upward from the smog atmospheric layer or outward from the urban area. Air moving upward from the smog atmospheric layer may move from the smog atmospheric layer to the mixing atmospheric layer. As shown in FIGS. 2A-2B, the smog may mix with air in the mixing atmospheric layer or may be carried away by ambient wind. This may cause smog from the smog atmospheric layer to mix with clean air in the mixing atmospheric layer, resulting in reduced smog within the urban area. Air moving outward from the urban area may be directed into a rural area located adjacent to the urban area. The plurality of turbines may direct smog from within the smog atmospheric layer outward into the rural area. The low pressure created by the moving air may cause clean air from the mixing atmospheric layer to flow into the smog atmospheric layer, diluting the amount of smog in the smog atmospheric layer. This combined removal of urban area smog to the rural area and mixing of air and smog between the smog atmospheric layer and mixing atmospheric layers may reduce the amount of smog within the urban area.

The method may further include any other features, components, or functions disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for reducing smog in an urban area, comprising:
    a smog atmospheric layer located above an urban surface of the urban layer, wherein the urban surface is a ground surface of the urban area;
    a mixing atmospheric layer located in and above the urban area proximate to the ground surface, wherein the smog atmospheric layer is at least a hectometer thick;
    a plurality of turbines located on the urban surface and moving a quantity of air between the smog atmospheric layer and the mixing atmospheric layer; and
    at least one air conduit through which the plurality of turbines move the quantity of air, wherein the at least one air conduit has a first end connected to a stationary location on the ground surface in the urban area and extends a hectometer or more through the smog atmospheric layer, and into the mixing atmospheric layer, wherein an opening at a second end of the at least one air conduit is positioned above the smog atmospheric layer, wherein the at least one air conduit is freestanding and without external or internal support, wherein the at least one air conduit is formed from a substantially flexible material having a tube-like shape, wherein the at least one air conduit has a naturally deflated state and converts to an expanded state when the quantity of air moved from one or more of the plurality of turbines generates a positive air pressure within the at least one air conduit, and wherein in the expanded state, the substantially flexible material having the tube-like shape forming the at least one air conduit becomes vertical and semi-rigid, and maintains the vertical and semi-rigid state as the quantity of air is moved through it.

2. The system of claim 1, wherein the plurality of turbines comprise at least one of: a wind turbine, an air pump, or an air fan.

3. The system of claim 1, wherein the plurality of turbines are located at or near the edge of the urban area.

4. The system of claim 1, wherein the smog atmospheric layer is substantially 500 meters thick or greater, and wherein the at least one air conduit extends substantially 500 meters or more through the smog atmospheric layer.

5. A method for reducing smog in an urban area, comprising the steps of:
    providing a plurality of turbines within the urban area having an urban surface, a smog atmospheric layer located in and above the urban surface, and a mixing atmospheric layer located above the smog atmospheric layer, wherein the urban surface is a ground surface of the urban area, and wherein the smog atmospheric layer is at least a hectometer thick;
    orienting the plurality of turbines to direct a quantity of air between the smog atmospheric layer and the mixing atmospheric layer; and
    operating the plurality of turbines to move the quantity of air between the smog atmospheric layer and the mixing atmospheric layer, wherein the quantity of air moves through at least one air conduit, wherein the at least one air conduit has a first end connected to a stationary location on the ground surface in the urban area and extends a hectometer or more through the smog atmospheric layer, and into the mixing atmospheric layer, wherein an opening at a second end of the at least one air conduit is positioned above the smog atmospheric layer, wherein the at least one air conduit is freestanding and without external or internal support, wherein the at least one air conduit is formed from a substantially flexible material having a tube-like shape, wherein the at least one air conduit has a naturally deflated state and converts to an expanded state when the quantity of air moved from one or more of the plurality of turbines generates a positive air pressure within the at least one air conduit, and whereby, in the expanded state, the substantially flexible material having the tube-like shape forming the at least one air conduit becomes vertical and semi-rigid, and maintains the vertical and semi-rigid state as the quantity of air is moved through it.

6. The method of claim 5, wherein the plurality of turbines comprise at least one of: a wind turbine, an air pump, or an air fan.

7. The method of claim 5, wherein the plurality of turbines are located at or near the edge of the urban area.

8. The method of claim 5, wherein the smog atmospheric layer is substantially 500 meters thick or greater, and wherein the at least one air conduit extends substantially 500 meters or more through the smog atmospheric layer.

* * * * *